Aug. 12, 1952
F. MALAGRINO
2,606,369
OPPOSED CONTACT MEASURING DEVICE
HAVING ADJUSTABLE TRANSMISSION
Filed Jan. 14, 1947
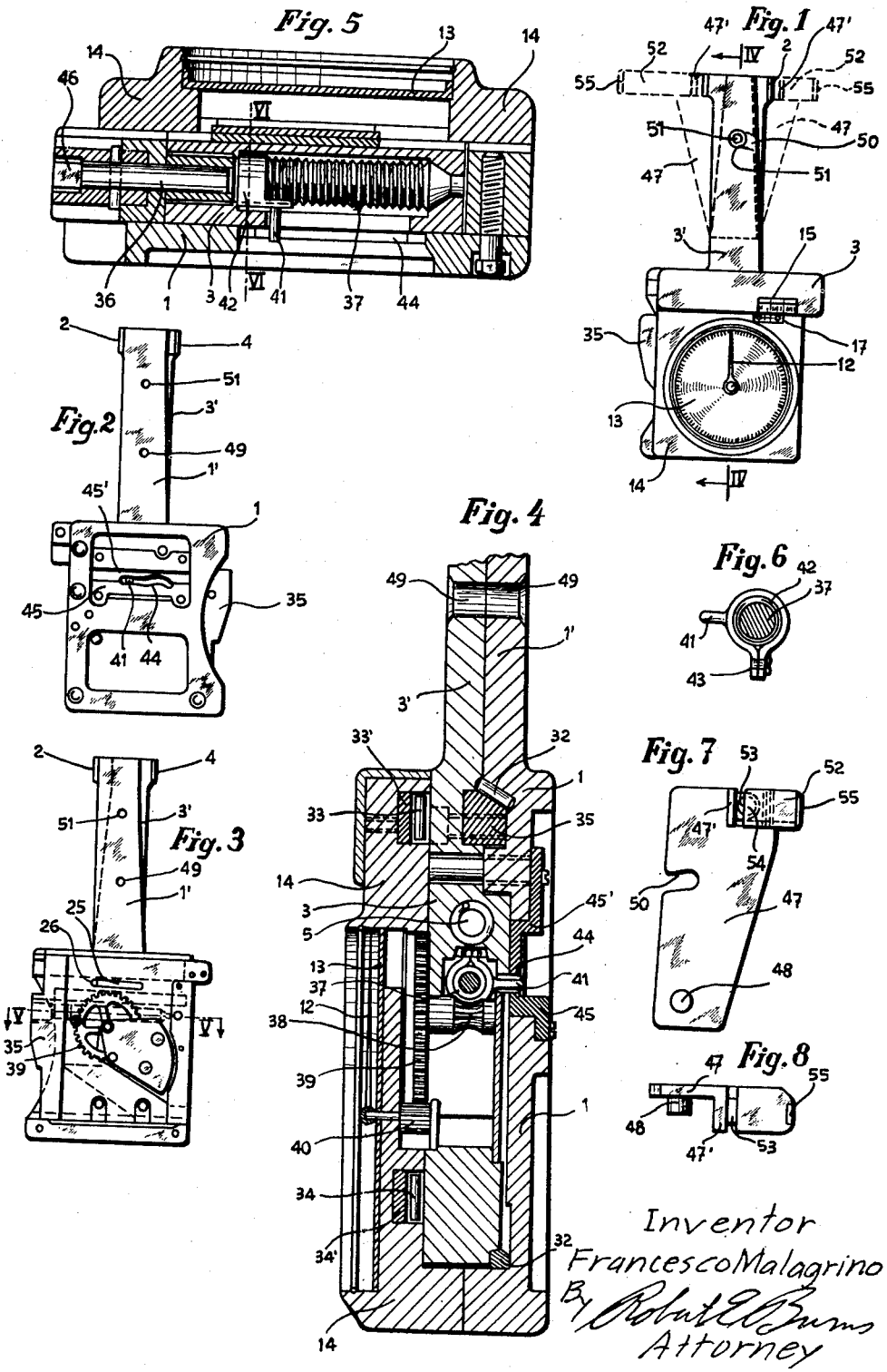
Inventor
Francesco Malagrino
By Robert E. Burns
Attorney Patented Aug. 12, 1952

2,606,369

UNITED STATES PATENT OFFICE 2,606,369

OPPOSED CONTACT MEASURING DEVICE HAVING ADJUSTABLE TRANSMISSION

Francesco Malagrino, Valenza, Italy

Application January 14, 1947, Serial No. 722,031
In Italy January 19, 1946

6 Claims. (Cl. 33—147)

This invention relates to a centesimal micrometer of the snap type for the measure of bores, which is considerably superior in efficiency to the known instruments of this kind.

An object of this invention is to provide an apparatus of the type referred to above comprising a box-shaped member having a measuring arm, a pointer for indicating the millimeters, and a dial for indicating fractions of millimeters, a member movable in said box-shaped member having a measuring arm and a millimeter scale cooperating with said measuring arm and said pointer, respectively, a spring interposed between said members for urging the measuring arms apart from each other, a hand-actuated push-botton for drawing together said measuring arms against the action of said spring, and adjustable means for transmitting the movement of said movable member to the pointer on said dial.

A further object of this invention is to provide in an apparatus of the type referred to above, worm screw transmission means acting as a rack for transmitting the rectilinear movement of the movable member to the pointer on the dial for indication of fractions of a millimeter, and as a helical gear for transmitting to the pointer on said dial correctional angular displacements imparted to the worm screw for correcting any error in reading due to slight play or inaccuracy in construction of the indicating device.

A further object of this invention is to provide in an apparatus of the type referred to above, a pin frictionally coupled with the worm screw and engaged by a shaped slot cut in the box-shaped member and determining over a predetermined range the angular movement conferred by hand to the worm screw.

A further object of this invention is to provide in an apparatus of the type referred to above, antifriction bearings for the movable member, of which two at least are adjustable for allowing for any play between the box-shaped member and the movable member.

Further features of the micrometer according to this invention shall be more fully explained with reference to the enclosed drawings on which:

Figure 1 is a front elevation of the instrument looking toward the face of the dial, the arms being drawn together and fitted with the expansion shanks.

Figure 2 is a rear elevation from the opposite side, the arms being drawn together and the expansion shanks being removed.

Figure 3 is a rear elevation, the cover being removed.

Figure 4 is a sectional view on an enlarged scale taken on line IV—IV of Fig. 1.

Figure 5 is a sectional view on an enlarged scale taken on line V—V of Fig. 3.

Figure 6 is a detail view of the pin fitted on the worm screw actuating the pointer on the dial indicating the fractions of a millimeter.

Figure 7 is a detail front view showing an expansion shank to be fitted on the anvil carrying arms.

Figure 8 is a plan view of the shank.

Referring to Figures 1 to 6, 1 denotes the stationary member of the micrometer carrying the arm 1' provided with an anvil 2. 3 denotes the movable member of the instrument carrying the arm 3' having the anvil 4 fitted thereto. The member 1 is hollow and forms, together with the cover 14, a box-shaped closed casing enclosing the movable member.

The movable member 3 slides on suitable guides on the stationary member 1 and on the cover 14 with the interposition of rollers or balls 32, 33 and 34 carried by suitable cages, each of which may carry as few as two rollers or balls only, maintaining them perfectly adjusted and with the desired spacing, these two rollers or balls being sufficient for the translation movement performed by the movable member 3. The position of the rollers 33 and 34 is adjustable by means of sliding plates 33', 34' in order to make up for any play of the member 3.

The member 3 is acted upon by a coiled spring 5, which tends to hold the arm 3' away from the arm 1' and, consequently, the anvil 4 apart from the anvil 2 over the maximum displacement of the member 3. The latter has secured thereto on one side the pin 26 mounted for displacement within the rectilinear slot 25 cut in the member 1 and limiting the movement of the movable member. The member 3 is caused to slide by pressing the outer knob 35 by one finger of the hand. This compresses the spring 5 and draws the member 3 and its arm 3' and anvil 4 toward the arm 1' of the element 1. On releasing the knob 35, the spring acts on the member 3 moving the arm 3' away from the arm 1' until the anvil abuts the work or until the pin 26 abuts the end of the slot 25.

A scale 15 subdivided into millimeters is secured to the outside of the movable member 3 or directly engraved thereon and corresponds in length to the maximum stroke of the member 3. The scale coacts with a pointer 17, adjustably attached to the stationary member 1 by which the distance between the outer surfaces of the anvils 2 and 4 can be read.

A spindle 36 is rotatably mounted in the movable member 3 and has a portion 37 provided with a worm-screw meshing with the teeth of a pinion 38 with helical teeth. The pinion may be rotated either by an axial displacement or by an angular displacement of the worm screw 37, that is, this screw acts both as rack and as transmission worm screw with respect to the pinion 38.

The pinion 38 has fixed thereto a toothed wheel 39 meshing with a pinion 40 keyed to a pin, having the pointer 12 for the dial 13 fixed to one of its ends. The dial is provided with a graduation over a full circumference including a hundred equal divisions each of which corresponds to $\frac{1}{100}$ millimeter displacement of the member 3 and anvil 4, the distance between two subsequent divisions being such that it is possible to estimate by approximation $\frac{2}{1000}$ millimeter. The transmission ratio between the worm screw 37 and the pinion 40 is such that a displacement by exactly one millimeter of the member 3 causes the pointer 12 to perform exactly a full turn over the dial 13.

For the purpose of greatest accuracy of readings of fractions of a millimeter on the dial and of allowing for possible slight errors in indication caused by imperfections and play in the teeth of the gears transmitting motion to the pointer, the worm screw 37 is provided with a correcting device. This device consists of a pin 41 connected to the screw 37 by means of a friction coupling. The pin serves for directing the movements of the worm screw due to displacements of the member 3 in a given direction. The pin 41, which is frictionally connected to the screw 37 by means of a collar 42 (Fig. 6) clamped on the screw 37 by means of a small bolt 43, slides within a shaped slot 44 (Fig. 2) under the action of the sliding movements imparted to the screw 37. The slot 44 is formed by two plates 45 and 45' secured to the member 1; the plate 45' being secured to the member 1 by means of a screw and slot connection, in such manner that they may be drawn towards each other. By moving in the slot 44 in either direction the pin 41 imparts slight angular movements in either direction to the screw 37, by which they are transmitted to the pinion 40, thereby correcting in either sense the readings on the dial 13 by means of the pointer 12, the slot 44 being shaped in such manner as to correct the indication for slightest play or inaccuracies in construction of the transmission gear. As mentioned above, the collar 42 is frictionally coupled to the screw 37 in order to set the pointer 12 at zero in the case the pointer should not resume this position after reading has been effected.

The end of the rod 36 is provided with nut-shaped extension 46 operable by means of a suitable spanner. By rotating the spindle 36 through small angles by means of the spanner without carrying along the collar 42 which is prevented therefrom by the pin 41 retained by the slot 44, the pointer 12 is returned to its initial position without any change in the relative position of the other members.

The expansion shanks adapted to enlarge the measuring range of the micrometer, which are fitted on the anvil-carrying arms of the instrument, are shown in Figures 7 and 8. Each shank consists of a plate 47 provided near its lower end with a projecting pin 48, which extends through a bore 49 in the arms 1' and 3'. The plate is formed above the pin 48, with a slot 50 in the form of an arc of a circle having its centre on the axis of the pivot 48. When the pivot 48 extends through the bore 49 and the plate 47 is rotated toward the arm, the slot 50 engages a pivot screw 51, threaded into a tapped hole in the arm 1' or 3', thereby clamping the plate 47 to the arm.

The plate 47 has secured to its upper end a pin 52 which, when the expansion shank is fitted on the arm 1' or 3' is in line with the anvil 2 or 4. A roller 53 is fitted at the inner end of the pin 52 and turns on a pivot 54; and anvil 55 of hard material being secured to the other end of the pin 52. The distance between the outer surface of the roller 53 and the outer face of the anvil 55 is adjusted at a fixed predetermined value.

It is possible to fit shanks having pins 52 of different lengths and either of the arms 1' or 3' or both of them may be fitted with a shank, whereby the instrument is adapted to operate over a very wide range.

Displacement of the movable member with respect to the stationary member takes place under the action of the spring 5 which tends to push back the rack 37. Therefore, the movable member 3 carrying the arm 3' is displaced with respect to the stationary member 1 so as to automatically cause the indicating arms to diverge as they are introduced into the recess to be measured.

What I claim is:

1. A gauge for measuring holes, comprising a box-shaped member having a measuring arm, a pointer for indicating millimeters, a dial for indicating fractions of a millimeter and a second pointer cooperating with said dial, a member movable in said box-shaped member and having a measuring arm and a millimeter scale cooperating with said first mentioned measuring arm and pointer, an adjustable transmission for transmitting the movement of said movable member to the second pointer, a spring between the box shaped member and the movable member for drawing apart said measuring arms, and a manually actuated push-button for drawing together said measuring arms against the action of said spring.

2. A gauge for measuring holes, comprising a box-shaped member having a measuring arm, a pointer for indicating millimeters, a dial for indicating fractions of a millimeter and a second pointer cooperating with said dial, a member movable in said box-shaped member and having a measuring arm and a millimeter scale cooperating with said first mentioned measuring arm and pointer, a worm screw gearing, having a worm screw rotatably mounted in said movable member, and a gear rotatably mounted in said box-shaped member and operatively connected with the second pointer, said worm screw acting as a rack for transmitting the translational movement of the movable member to the pointer on said dial, and being rotatable by hand to correct any play in the transmission, a spring between the box-shaped member and the movable member for drawing apart said measuring arms, and a hand-actuated push-button for drawing together said measuring arms against the action of said spring.

3. A gauge for measuring holes, comprising a box-shaped member having a measuring arm, a pointer for indicating millimeters, a dial for indicating fractions of a millimeter and a second pointer cooperating with said dial, a member movable in said box-shaped member and having a measuring arm and a millimeter scale cooperating with said first mentioned measuring arm and pointer, a wormscrew mounted for rotation in said movable member, a gear mounted in said box-shaped member and meshing with said wormscrew and operatively connected with the second pointer, the translational movement of said movable member being transmitted to said gear by said wormscrew acting as a rack, a pin frictionally coupled with said wormscrew and engaged by a shaped slot formed in said box-shaped member for correction of any play in the worm gear transmission, a spring between the box-shaped member and the movable member for drawing apart said measuring arms, and a hand-actuated push-button for drawing together said measuring arms against the action of said spring.

4. A gauge as claimed in claim 3, in which the shaped slot is formed by plates adjustably mounted on the box-shaped member.

5. A gauge for measuring holes, comprising a box-shaped member having a measuring arm, a pointer for indicating millimeters, a dial for indicating fractions of a millimeter and a second pointer cooperating with said dial, a member movable in said box-shaped member and having a measuring arm and a millimeter scale cooperating with said first mentioned measuring arm and pointer, antifriction bearings for said movable member mounted in said box-shaped member, at least two of which being adjustable to allow for any play between said members, a transmission for transmitting the movement of said movable member to the pointer for said dial, pin and slot means coacting with the transmission and making correction of any play therein, a spring between the box-shaped member and the movable member for drawing apart said measuring arms, and a hand-actuated push-button for drawing together said measuring arms against the action of said spring.

6. A gauge as claimed in claim 3, in which the wormscrew is provided with a nut-shaped extension operable by means of a spanner through which said wormscrew may receive slight angular movements with respect to the frictionally coupled pin for restoring the pointer to the zero position on the dial.

FRANCESCO MALAGRINO.

REFERENCES CITED

The following references are of record in the file of this patent:

UNITED STATES PATENTS

| Number | Name | Date |
| --- | --- | --- |
| 443,869 | Riglander | Dec. 30, 1890 |
| 694,028 | Protherode | Feb. 25, 1902 |
| 1,145,922 | Rigamont | July 13, 1915 |
| 1,194,182 | Kaplan | Aug. 8, 1916 |
| 1,245,324 | Droitcour | Nov. 6, 1917 |
| 1,274,331 | Rockwell | July 20, 1918 |
| 1,355,724 | Zhukoff | Oct. 12, 1920 |
| 1,488,984 | Heyne | Apr. 1, 1924 |
| 1,528,314 | Wickman | Mar. 3, 1925 |
| 1,621,526 | Culell | Mar. 22, 1927 |
| 2,173,519 | Jones | Sept. 19, 1939 |
| 2,210,435 | Ruf | Aug. 6, 1940 |
| 2,282,114 | Brister | May 5, 1942 |

FOREIGN PATENTS

| Number | Country | Date |
| --- | --- | --- |
| 26,007 | Sweden | Dec. 12, 1908 |
| 63,052 | Germany | June 27, 1892 |
| 408,394 | Great Britain | Apr. 12, 1934 |